United States Patent Office 3,342,867
Patented Sept. 19, 1967

3,342,867
CHLORO-DIFLUORAMINO COMPOUNDS AND
PREPARATION
Jeremiah P. Freeman and Robert C. Petry, Huntsville, Ala., assignors to Rohm & Haas Company, Philadelphia, Pa., a corporation of Delaware
No Drawing. Filed Mar. 24, 1961, Ser. No. 98,260
12 Claims. (Cl. 260—583)

This invention concerns hydrocarbons containing chloro- and difluoroamino substituents and processes for preparing them. More specifically, it concerns reactions between monoethylenically unsaturated aliphatic hydrocarbons and chlorodifluoramine, $ClNF_2$, and the products resulting therefrom.

The products of the present invention, as such, or in admixture with the accompanying by-products of the reaction, are excellent solvents for a variety of compounds. They are of particular value as solvents for difficultly soluble polymers, such as poly(vinyl chloride) and its copolymers.

The products of the present invention have the following empirical formula:

$$RClNF_2$$

in which R is a saturated aliphatic radical selected from the group consisting of $C_2H_4$, $C_3H_6$ and $C_4H_8$.

These products are prepared by the addition reaction of $ClNF_2$ to ethylene, propylene and butene. Higher monoethylenically unsaturated aliphatic hydrocarbons can also be used in the process of this invention, but they give very complex mixtures of chloro- and difluoramino-substituted hydrocarbons which are difficult to separate and purify.

The preparation of $ClNF_2$ is set forth in Ser. No. 62,561, filed Nov. 30, 1960, now Patent No. 3,101,997 issued Aug. 27, 1963.

The ratios of $ClNF_2$ to the unsaturated hydrocarbon can be varied widely and still be within the scope of the present invention. Little difference in the course of the reaction or the yields was noted when the molar ratios of the $ClNF_2$ to the aliphatic hydrocarbon were varied from 2:1 to 1:2. The preferred embodiment however, employs a molar ratio of 1:1.

The reaction temperature range is from 50° to 200° C. with the preferred range being from 120° to 140° C. The temperature required can be lowered by irradiating the reaction mixture with ultraviolet light, but this does not represent the preferred embodiment.

The reaction can be carried out as subatmospheric, atmospheric or superatmospheric pressure, but it is generally carried out at subatmospheric pressures. Pressures in the range of 100 to 500 mm. are preferred.

The reaction time will vary from about 2 to about 24 hours depending on the reactivity of the hydrocarbon and the reaction temperature employed.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

*Reaction of $ClNF_2$ with ethylene*

A 1 liter Pyrex bulb equipped with stopcock and ball joint for attachment to a vacuum line was charged in vacuo with 200 mm. each (0.011 mole) of ethylene and $ClNF_2$. The reaction mixture was heated at 130° C. for 12 hours. The contents of the reaction bulb were distilled in vacuo through traps cooled to −96° C. and −196° C. There was no non-condensable fraction. The −196° C. fraction amounted to 0.002 mole and was found to be a mixture of $ClNF_2$ and ethylene by mass spectral analysis. The −96° C. fraction weighed 1.1 grams (91% yield). The three products comprising this fraction were separated by gas chromatography on a dinonyl phthalate column operated at 78° C. They were identified as 1,2-bis-difluoroaminoethane, $F_2NCH_2CH_2NF_2$, 1-chloro-2-difluoraminoethane, $ClCH_2CH_2NF_2$ and 1,2-dichloroethane. Based on peak area ratios, the respective products were present in the ratio of 1:2:1. Characterization and analytical data on the difluoramino compounds is given in Table I:

TABLE I.—CHARACTERIZATION DATA FOR ETHYLENE-$ClNF_2$ PRODUCTS

| Product | B.P. | Position of $F^{19}$ * N.M.R. (Resonance) | Analysis Calc'd | Analysis Found |
|---|---|---|---|---|
| $F_2NCH_2CH_2NF_2$ | 72° C./760 mm. | −5190 cycles (triplet) | C, 18.19 H, 3.05 N, 21.21 F, 57.55 | C, 18.60 H, 3.29 N, 20.55 F, 55.9 |
| $ClCH_2CH_2NF_2$ | 75° C./760 mm. | −5248 cycles (triplet) | C, 20.79 H, 3.49 N, 12.13 F, 32.90 Cl, 30.69 | C, 21.77 H, 3.75 N, 12.91 F, 33.16 Cl, 29.10 |
| $ClCH_2CH_2Cl$ | | Identified by mass spectrum and infrared spectrum. | | |

NOTE: * $CF_3COOH$ standard, Proton spectra were also in accord with the structural arrangements.

EXAMPLE II

*Reaction of $ClNF_2$ with propylene*

A 1 liter Pyrex bulb equipped with stopcock and ball joint for attachment to a vacuum line was charged in vacuo with 200 mm. each (0.011 mole) of propylene and $ClNF_2$. The reaction mixture was heated at 130° C. for six hours. The contents of the reaction bulb were distilled in vacuo through traps cooled to −96° C. and −196° C. There was no non-condensable fraction. The −196° C. fraction amounted to $8 \times 10^{-4}$ mole and was found to be a mixture of $ClNF_2$ and propylene by mass spectral analysis. The −96° C. fraction weighed 1.30 grams (96% yield). Gas chromatography of the product fraction on a divinyl phthalate column at 88° C. showed the presence of four components. These were trapped and identified as 1,2-bis-difluoramino propane, $F_2NCH_2CH(NF_2)CH_3$ 1-chloro-2-difluoramino propane, $ClCH_2CH(NF_2)CH_3$, 1-difluoramino-2-chloropropane, $F_2NCH_2CHClCH_3$, and 1,2-dichloropropane. Based on the peak area ratios, the respective products were present in the ratio 1:0.3:0.9:1. Characterization and analytical data on the difluoramino compounds is given in Table II:

TABLE II.—CHARACTERIZATION DATA FOR PROPYLENE-ClNF₂ PRODUCTS

| Product | B.P. | Position of F¹⁹ * N.M.R. (Resonance) | Analysis Calc'd | Analysis Found |
|---|---|---|---|---|
| $F_2NCH_2CH(NF_2)CH_3$ | 83° C./760 mm. | −5290 cycles ($CH_2$—$NF_2$) triplet | C, 24.66 H, 4.14 N, 19.18 F, 52.02 | C, 24.72 H, 4.74 N, 18.05 F, 49.9 |
| $ClCH_2CH(NF_2)CH_3$ | 85° C./760 mm. | −4570 cycles (—$CH$—$NF_2$) unresolved −4681 cycles unresolved | C, 27.81 H, 4.67 N, 10.81 F, 29.29 Cl, 27.32 | C, 27.86 H, 4.74 N, 11.25 F, 32.9 Cl, 27.45 |
| $F_2NCH_2CHClCH_3$ $ClCH_2CHClCH_3$ | 85° C./760 mm. | −5312 cycles triplet Identified by mass spectrum and infrared spectrum. | | |

NOTE: * $CF_3COOH$ standard, Proton spectra were also in accord with the structural arrangements.

EXAMPLE III

*Reaction of ClNF₂ with butylene*

Using the process as set forth in Example II, an equimolar amount of butylene was substituted for propylene. Isomeric chlorodifluoraminobutanes were recovered from the reaction mixture.

We claim:
1. Compounds of the formula

$$RClNF_2$$

in which the chlorine and difluoramino groups are on adjacent carbon atoms and in which R is selected from the group consisting of $C_2H_4$, $C_3H_6$, and $C_4H_8$.
2. 1-chloro-2-difluoraminoethane.
3. 1-chloro-2-difluoraminopropane.
4. 1-chloro-2-difluoroaminobutane.
5. 2-chloro-3-difluoroaminobutane.
6. 2-chloro-1-difluoraminopropane.
7. 2-chloro-1-difluoroaminobutane.
8. A process for the preparation of chloro-difluoroamino compounds of the general formula $$RClNF_2$$

in which the chlorine and difluoramino groups are on adjacent carbon atoms and in which R is selected from the group consisting of $C_2H_4$, $C_3H_6$ and $C_4H_3$ which comprises reacting chlorodifluoramine, $ClNF_2$, with an aliphatic hydrocarbon selected from the group consisting of ethylene, propylene and butene at a temperature of from 50° to 200° C. and separating the chloro-difluoramino compounds from the reaction mixture.

9. A process as set forth in claim 8 in which the molar ratio of $ClNF_2$ to aliphatic hydrocarbons is 1:1.

10. A process as set forth in claim 8 in which the reaction pressure can be from subatmospheric to superatmospheric.

11. A process as set forth in claim 8 in which the reaction pressure is subatmospheric.

12. A process as set forth in claim 8 in which the reaction temperature is from 120° C. to 140° C.

No references cited.

CHARLES B. PARKER, *Primary Examiner.*

L. D. ROSDOL, *Examiner.*

J. W. WHISLER, *Assistant Examiner.*